Figure 1:
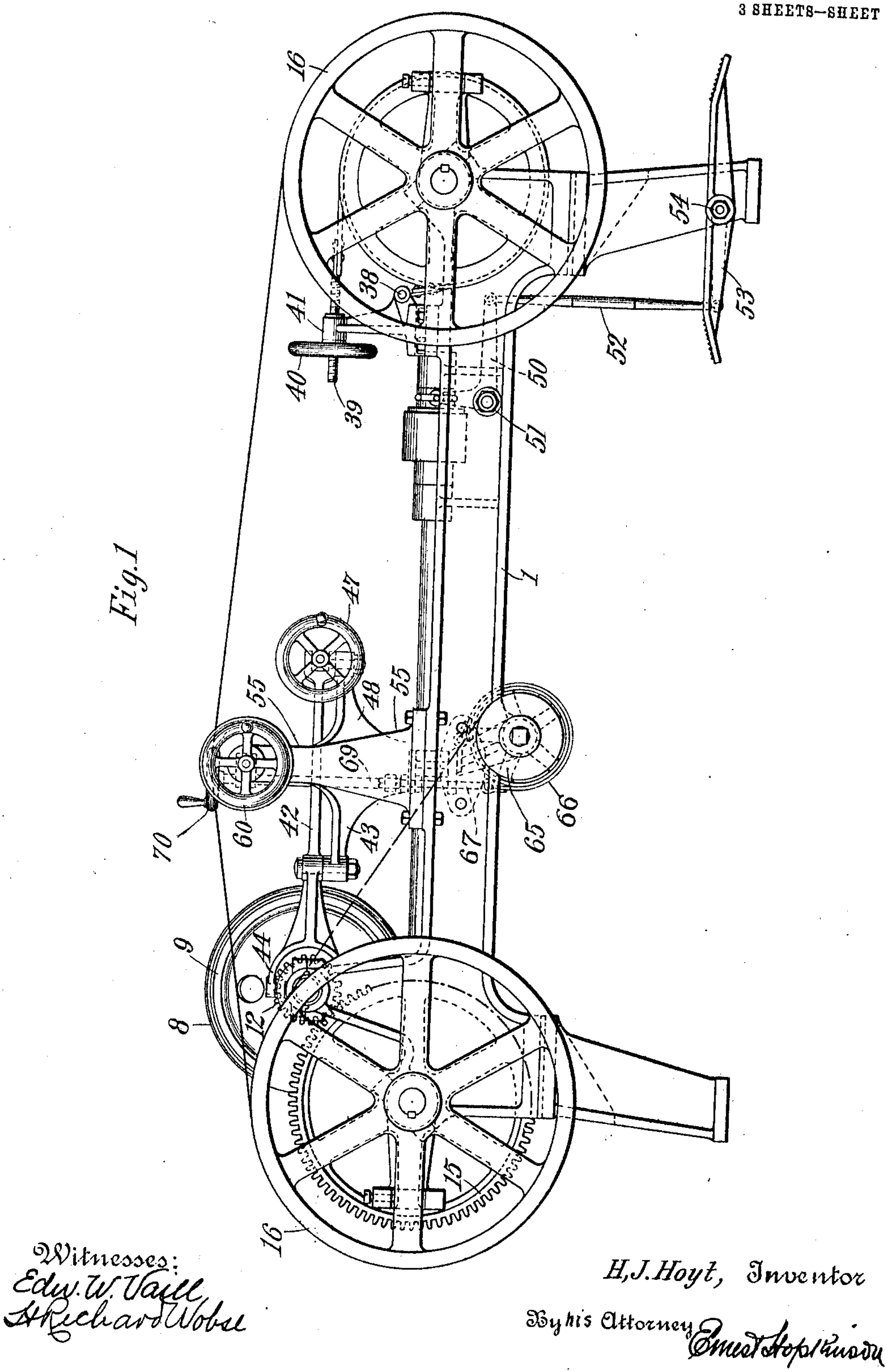

1,020,097.

H. J. HOYT.

WINDING OR WRAPPING MACHINE.

APPLICATION FILED JAN. 14, 1910.

Patented Mar. 12, 1912.

3 SHEETS—SHEET 1.

Witnesses:
Edw. W. Vaill
H Richard Wobse

H. J. Hoyt, Inventor
By his Attorney Ernest Hopkinson

COLUMBIA PLANOGRAPH CO., WASHINGTON, D. C.

H. J. HOYT.
WINDING OR WRAPPING MACHINE.
APPLICATION FILED JAN. 14, 1910.

1,020,097.

Patented Mar. 12, 1912.

3 SHEETS—SHEET 2.

Witnesses:
Edw. W. Vaill
H. Richard Wobbe

Inventor
H. J. Hoyt
By his Attorney
Ernest Hopkinson

COLUMBIA PLANOGRAPH CO., WASHINGTON, D. C.

H. J. HOYT.

WINDING OR WRAPPING MACHINE.

APPLICATION FILED JAN. 14, 1910.

1,020,097.

Patented Mar. 12, 1912.

3 SHEETS—SHEET 3.

Witnesses:

Edw. W. Vaill

H. Richard Wobse

H. J. Hoyt, Inventor

By his Attorney Ernest Hopkinson

COLUMBIA PLANOGRAPH CO., WASHINGTON, D. C.

UNITED STATES PATENT OFFICE.

HOMER J. HOYT, OF DETROIT, MICHIGAN, ASSIGNOR TO MORGAN & WRIGHT, OF DETROIT, MICHIGAN, A CORPORATION OF MICHIGAN.

WINDING OR WRAPPING MACHINE.

1,020,097. Specification of Letters Patent. Patented Mar. 12, 1912.

Application filed January 14, 1910. Serial No. 538,037.

*To all whom it may concern:*

Be it known that I, Homer J. Hoyt, a citizen of the United States, residing in the city of Detroit, State of Michigan, have invented certain new and useful Improvements in Winding or Wrapping Machines, of which the following is a full, clear, and complete disclosure.

My invention relates to that class of machines in which wire is wound on the outer cylindrical surface of a mold, such as molds used in vulcanizing rubber automobile or bicycle tires. Such molds are usually in the shape of a short cylinder or pulley and have formed in their surfaces depressions which are in the form of the outline desired to be given to the outer surface of the tire when completed. Before the vulcanizing process is carried out, it is necessary to place the rubber in the mold on the surface of the cylinder and to wrap the same with a suitable fabric to protect the surface during vulcanization and also to wind upon the surface of the mold over the tire, a layer of wire under considerable pressure in order to hold the wrapper securely in position and to force the rubber into the outlines of the mold.

The object of my invention is to provide a machine for winding wire upon molds such as above described, not only more evenly and uniformly than has heretofore been possible, but with greater tension of the wire and in a shorter time.

A further object of my invention is also to obviate the necessity of winding the wire onto a reel or spool when removing it from the mold and thereafter rewinding it on another mold.

Briefly stated, therefore, my invention comprises a machine through the operation of which wire may be wound evenly and quickly on to the surface of a mold and then unwound from said mold and wound directly on to another mold, thus obviating the necessity of several useless handlings of the wire.

Other features of improvement and advantage resulting from my invention will be hereafter pointed out more in detail.

Figure 2:
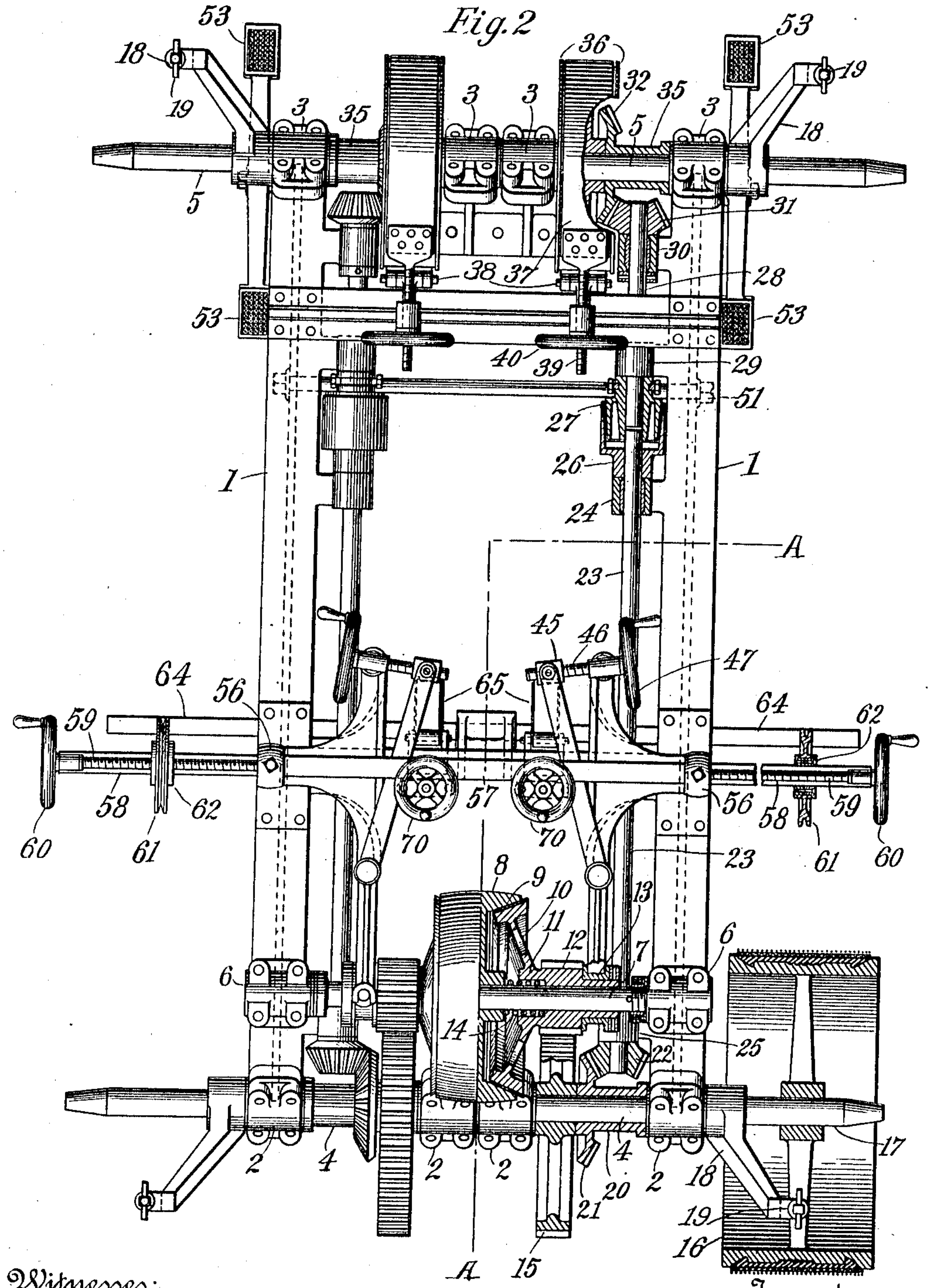
Figure 3:
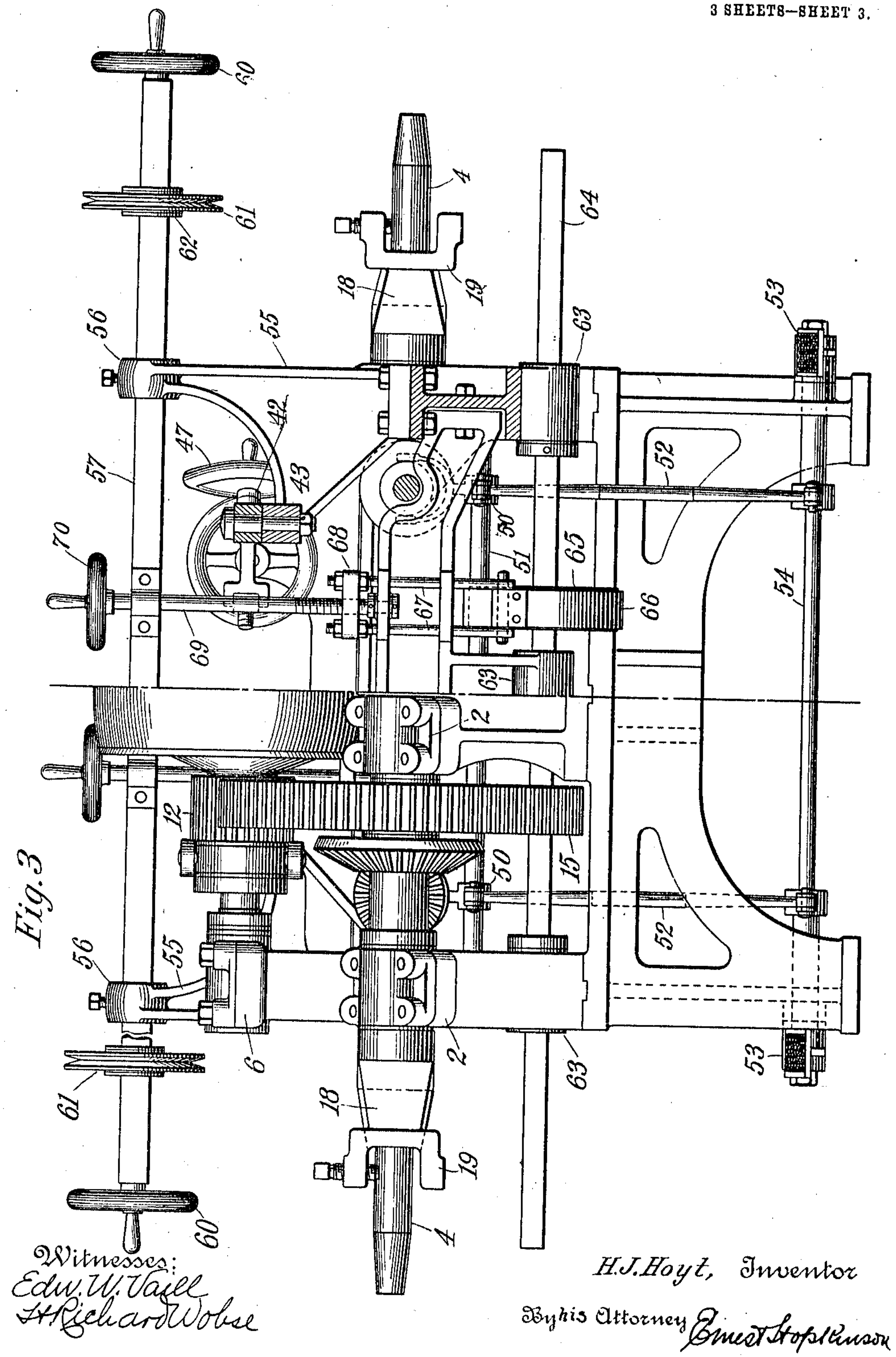

For a full, clear and exact description of one form of my invention, which I at present deem preferable, reference may be had to the following specification and the accompanying drawings forming a part thereof, in which:

Figure 1 is a side elevation of my improved machine, indicating the way in which the wire is placed thereon. Fig. 2 is a plan view thereof, parts of the gearing and clutches being shown in section. Fig. 3 is a view of the end of the machine indicated at the lower side of Fig. 2, the right hand side of said Fig. 3 being a transverse sectional view taken substantially on the line A—A, Fig. 2.

Referring to the drawings, the numeral 1 indicates a suitable frame or bed which at its opposite ends is provided with shaft bearings 2—2 and 3—3 which respectively carry the transverse shafts 4—4 and 5—5. Another set of bearings 6—6 are provided on the frame 1 adjacent the bearings 2—2 and carry the main driving shaft 7. On this shaft is mounted the main driving pulley 8 adapted to receive power from a suitable source by means of a driving belt of the usual form. At this point it should be noted that both sides of the machine are practically duplicates of each other, thereby allowing two sets of molds to be treated at the same time.

The inner side of the pulley 8 is provided with two inclined surfaces 9 each adapted to be engaged by a conical or tapering clutch member 10 which may be covered with any suitable material for giving a good frictional contact with the pulley 8. The clutch member 10 is carried on a longitudinal sleeve 11 which is adapted to slide longitudinally on the shaft 7, said sleeve being provided at its central portion with a spur pinion 12 and at its outer end with a flanged collar 13. A spring 14 tends to keep the sleeve 11 forced toward the right, (shown in Fig. 2) thereby tending to keep the clutch member 10 disengaged from the pulley 8. The spur pinion 12 engages a gear 15 fixed to the shaft 4. By this means said shaft 4 is given a rotary movement when the clutch member 10 and pulley 8 are engaged, the mold 16 being mounted on the end of the shaft 17 which projects beyond the frame of the machine. A radially and outwardly extending arm 18 is attached to said shaft 4 adjacent the bearing 2 and carries at its upper end a dog in the form of a screw clamp 19, as indicated at the right hand side of Fig. 3. This engages one of the supporting arms of the mold 16 and causes the same to rotate positively on the shaft 4.

A sleeve 20 is placed on the shaft 4 adjacent the gear 15 and is either rigidly connected with the hub of said gear or keyed to said shaft. This sleeve 20 carries a beveled gear 21 which meshes with a beveled pinion 22 carried on the end of the shaft 23 arranged longitudinally of the machine and carried in the bearings 24 and 25. The shaft 23 carries at its other end a cup-shaped frictional clutch member 26 which coöperates with the internal clutch member 27 carried on the end of a short shaft 28 mounted in the bearings 29 and 30, said shaft 28 being practically a continuation of the shaft 23 but being separated therefrom within the clutch member 27 as indicated. The outer end of the shaft 28 carries a beveled pinion 31 which meshes with the beveled gear 32 carried on the sleeve 35 which is rigidly fixed on the shaft 5. A flanged pulley or drum 36 is also rigidly mounted on the shaft 5 and its peripheral surface is engaged by a brake-band 37, one end of which is attached to the frame of the machine at 38, while the other end terminates in a screw-threaded rod 39 which is engaged by the screw-threaded hub of the hand-wheel 40 which is held in position by the bracket 41 also carried by the frame of the machine. By this arrangement of gears and clutches, the transverse shaft at one end of the machine is made to rotate so that wire may be unwound from a drum mounted on the opposite shaft and rewound on a drum mounted on the first of said shafts, as indicated in Fig. 1. The drum 36 and its coöperating brake-band 37 give the requisite drag to the drum from which the wire is being unwound so that the wire will produce the requisite pressure upon the opposite drum, and this pressure may be easily adjusted by means of the hand-wheel 40.

The tapering or conical clutch member 10 is controlled by means of a lever 42 pivoted on the bracket 43, said lever being provided at its left hand end, as shown in Fig. 1, with a yoke 44 which coöperates with the flanged collar 13 on the sleeve 11. The opposite end of the lever 42 engages a pivoted nut 45 through which passes a screw-threaded shaft 46 which carries at its outer end a hand-wheel 47, said hand-wheel and shaft being supported pivotally by the bracket 48. It will now be seen that by turning the hand-wheel 47 in one direction or the other, the clutch member 10 will be moved into or out of engagement with the main driving pulley 8.

The slidable clutch member 27 on the longitudinal shaft 23 is operated by means of a bell crank lever 50 pivoted on the rod 51. This bell crank lever connects with the vertical rod 52 which is connected at its lower end with the foot-lever or treadle 53 pivoted on a rod 54 between the standards of the machine. The last mentioned clutch members and their connection with the treadle 53 are principally intended for use in driving the shaft 5 when the article previously wrapped is being removed from the mold after the wire has been wound onto the drum carried by the shaft 4, said clutch members being disengaged while the wire is being unwound.

The vertical standards 55 carried on the central portion of the frame 1 are provided at their upper ends with the housings 56 through which passes the slotted bar 57, said bar having its upper and under sides removed where it projects beyond the side of the frame, as indicated at 58. Screws 59 are located within the channel thus formed in the hollow bar 57 and are provided at their outer ends with the hand-wheels 60 by which they are rotated.

Sheaves 61 are rotatably mounted in the split and flanged bushings or collars 62, which have projections (not shown) adapted to engage the screws 59 thereby forming half-nuts so that the sheaves are moved transversely by the rotation of the screws 59. As indicated in Fig. 1, these sheaves are adapted to receive the wire being wound from one drum to the other and when the hand-wheels are turned they are moved transversely so that the wire is laid upon the drum evenly and accurately.

The lower side of the frame 1 carries suitable bearings 63 through which the transverse shafts 64 pass. These shafts are not continuous but are divided at the middle of the machine so as to be independently rotatable, and each of them carries a flanged pulley or drum 65, the surfaces of which are engaged by the brake-bands 66 which terminate in the parallel rods 67 (Fig. 3) which are connected with the yoke 68 through which the screw 69 passes, the latter terminating at its upper end in the hand-wheel 70, whereby the pressure upon the surface of the brake drums 65 is regulated.

The outer ends of the shafts 64 are square and are adapted to receive spools or reels from which the fabric may be unwound and wound onto either of the molds previous to the application of the wire. These shafts may also be used for holding a coil of wire when it is first wound on to a mold.

The use and operation of my improved machine may be briefly described as follows: The drum to be wrapped with wire is placed on one of the shafts 4 and one to be unwrapped is placed on one of the shafts 5. A shell or spool holding cloth wrappers is placed on the corresponding square shaft 64 and the shaft 4 is then revolved by throwing the clutch member 10 into engagement with the pulley 8 through the operation of the hand-wheel 47. The cloth wrappers are then wound onto the mold or drum by being unwound from the spool or shell on the shaft 64, the requisite tension being given by means of the adjustment of the brake-band 66 through the medium of the hand-wheel 70. When sufficient cloth wrapping is in place on the mold, the shaft 4 is stopped and the cloth wrapping is cut. Now suppose a wrapped mold has also been placed on the shaft 5, the wire from said mold is led over the guide sheave 61 and fastened to the rim of the mold located on the shaft 4. This shaft is again caused to revolve by means of the clutch and hand-wheel before mentioned, the requisite tension being given to the wire by adjustment of the brake-band 37 through the medium of the hand-wheel 40, and the wire is guided evenly across the face of the mold by means of the sheave 61 which is moved transversely by manual operation of the hand-wheel 60. When the wire has completely passed from one mold to the other, its end is fastened in position on the recently wound mold and said mold is removed from its shaft. The cloth wrappings are then removed from the mold at the opposite end of the machine and by the use of a thin, flat bar known as a "skinning bar" the previously unwrapped tire or other article is removed by placing the bar on the face of the mold beneath said article. The outer end of the foot-lever or treadle 53 is then pressed down, throwing the clutch member 27 into engagement with the clutch member 26, the hand-wheel 40 having been previously turned to release the brake-band 37. This operation causes the shaft 5 to revolve carrying the mold with it, and the revolution of this mold against the "skinning bar" which is held firmly by the operator causes it to loosen the article on the face of the mold, after which it may be easily removed by continuing the revolutions of the mold on said shaft and holding the "skinning bar" at the requisite angles over the edge of the drum. The removal of the mold or drum from the shaft completes the cycle of operation and that side of the machine may be used for the further unwrapping and wrapping operation. Obviously the machine is not limited to the particular use described.

Having described this form of my invention, what I claim and desire to protect by Letters Patent is:

1. In a winding machine, the combination of a plurality of supporting shafts having outwardly projecting unobstructed ends, means for interchangeably fixing drums or molds on the ends of said shafts, a main driving shaft having fixed and loose clutch members thereon, gears connecting said movable clutch member with one of said supporting shafts, a band-brake on the second of said supporting shafts, means connecting the last named shaft with said loose clutch member for positively rotating said shaft and means for guiding the wire from one of said drums across the surface of the other of said drums.

2. In a winding machine, the combination of a plurality of supporting shafts having outwardly projecting unobstructed ends, means for interchangeably fixing drums or molds on the ends of said shafts, a main driving shaft having fixed and loose clutch members thereon, gears connecting said movable clutch member with one of said supporting shafts, a longitudinal shaft in two sections, gearing between said supporting shafts and said longitudinal shaft, a clutch for connecting the sections of said longitudinal shaft, a band-brake on the second of said supporting shafts and means for guiding the wire from one of said drums across the surface of the other of said drums.

3. In a winding machine the combination of a plurality of parallel centrally divided supporting shafts, means for detachably and interchangeably fixing drums or molds on the ends of each of said shafts, a main driving wheel, clutch members coöperating with said wheel and operative respectively upon the two sections of one of said supporting shafts, driving shafts connecting two opposite parallel sections of said supporting shafts, clutches in said driving shafts, and brakes for retarding the rotation of the last named sections of said supporting shafts.

Signed at Detroit, Michigan, this 11th day of January, 1910.

HOMER J. HOYT.

Witnesses:
H. C. SPARR,
EDWARD J. SAVAGE.

Copies of this patent may be obtained for five cents each, by addressing the "Commissioner of Patents, Washington, D. C."